Figure 1:
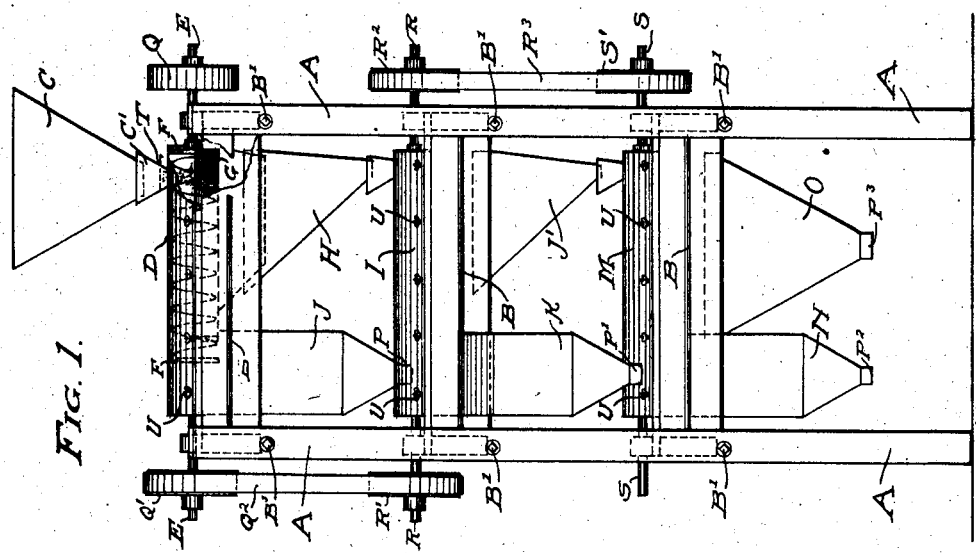

No. 835,057. PATENTED NOV. 6, 1906.
F. CONNER.
MECHANISM FOR GRADING GROUND COFFEE.
APPLICATION FILED FEB. 27, 1906.

2 SHEETS—SHEET 1.

Witnesses:
Roni S. Berry
Ida M. Daskam

Inventor.
Frank Conner.
By St. John Day,
Attorney.

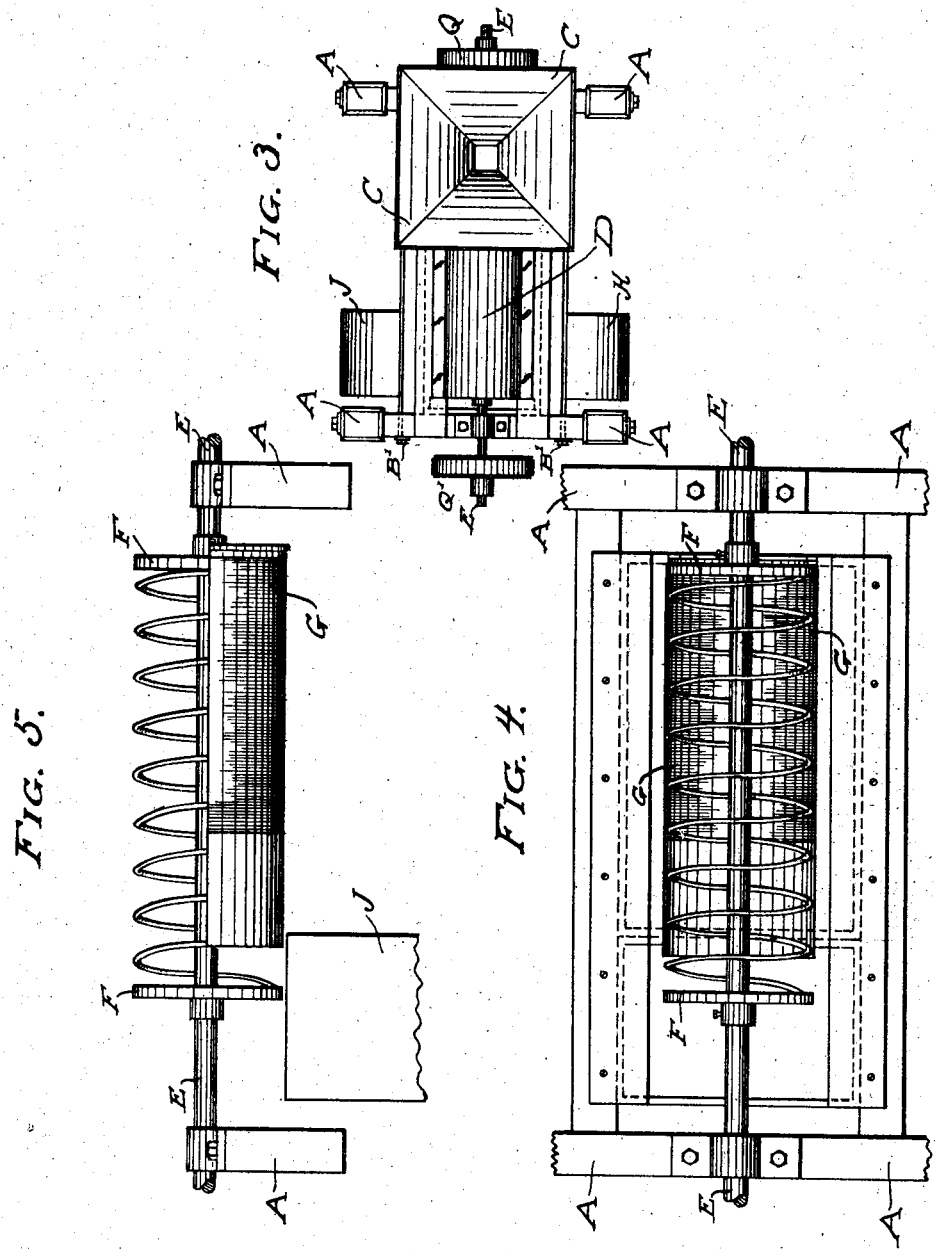

UNITED STATES PATENT OFFICE.

FRANK CONNER, OF LOS ANGELES, CALIFORNIA.

MECHANISM FOR GRADING GROUND COFFEE.

No. 835,057.   Specification of Letters Patent.   Patented Nov. 6, 1906.

Application filed February 27, 1906. Serial No. 303,280½.

*To all whom it may concern:*

Be it known that I, FRANK CONNER, of the city of Los Angeles, in the county of Los Angeles, in the State of California, have invented certain Mechanism for Grading Ground Coffee, which may also be used for analogous grading purposes, of which the following is a full, clear, and exact description or specification, reference being had to the annexed drawings, and to the letters marked thereon.

My said invention, which relates to new or improved mechanism for separating ground coffee into its different grades of size—that is to say, separating it into collections of particles wherein the particles in each collection are practically of the same dimension—consists in respect of its essential feature of a somewhat slowly-revolving shaft upon which a helix of wire is so mounted that it constitutes in its exterior form a cylindrically-surfaced body. Any desired distance is arranged between each turn of the wire helix, and to carry it upon the revolving shaft, as well as to retain it in sufficient tension to rotate with the shaft and to be of constant diameter throughout, each end of the wire helix is fastened into a circular carrier of practically the same diameter fastened to the revolving shaft, so as to revolve with said shaft. This revolving helix of wire is contained within a circular casing in the upper part of which a hopper is situated, whereinto the ground coffee or analogous material to be graded is placed, and in the lower part of this hopper a sliding gage-valve or door is situated, which having its position regulated by an attendant in operating the machine adjusts the dimension of the opening through which the coffee passes into one end of the cylindrical casing, wherein the aforesaid revolving wire helix operates. The greater part of the bottom of the cylindrical casing in which the wire helix operates is formed of wire-cloth the meshes of which are of such size that the coarser parts of the ground coffee or analogous material will not pass through them, but are carried slowly forward toward the end of the wire sieve, while those portions of the coffee or other materials which are of the size capable of passing through the wire sieve fall into a hopper beneath the sieve of the casing, while the coarser portions of the ground coffee or analogous material are discharged by the rotation of the helical wire into a hopper at the other end of the cylindrical casing, from which hopper this coarser portion of coffee or analogous material can be collected by opening a door or drawer at the lower part of that hopper.

The second hopper, or that into which the ground coffee or analogous material has fallen in passing through the sieve of the first hopper, communicates with a second helical rotating wire contained within a casing similar to the casing wherein the first rotating helical wire is contained, as hereinbefore described, and in passing through this casing the action of the rotating helical wire therein gradually moving forward the ground coffee over a screen of finer mesh separates or grades it, so that the finer particles thereof pass into the hopper below the screen of this second separating-casing, and the coarser portions thereof, which do not pass through this screen of finer mesh, drop into a hopper at the other end of this casing and are collected as ground coffee or analogous material of finer grade than that which has been separated by the action of the revolving helical wire in the first trough or casing. This second grade of coffee or analogous material is removable from the hopper in which it is caught by a door, or drawer or the equivalent of either of these, situated at the bottom of the hopper containing this second grade of coffee or analogous material. The coffee which has passed through the screen of finer mesh in the second casing passes down from its hopper into a hopper forming part of a third casing with a similar rotating wire helix at the interior thereof, the finer portion of which passes through a screen of still finer mesh in the lower part of this third casing, while any coffee or analogous material which does not pass through this third and finest-meshed screen falls into another hopper at the end of this casing, from which it is collected.

Although I have herein described three rotating wire helices, three troughs wherein such helices rotate, three screens having meshes of gradually-increasing fineness, and three hoppers for receiving in the graded state three different sizes of coffee or analogous material, it is to be understood that my invention is not limited to three of each of the aforesaid devices used in combination in my invention and that my invention is complete according to the character of the ground material for the separation or grading of which it is to be used either as one of the aforesaid devices consisting of a hopper and revolving wire helix and bottom and partly consisting of a screen mesh and hopper and partly consisting of a portion not having any mesh, but having a hopper into which the coarser part of the ground material is collected.

Figure 2:
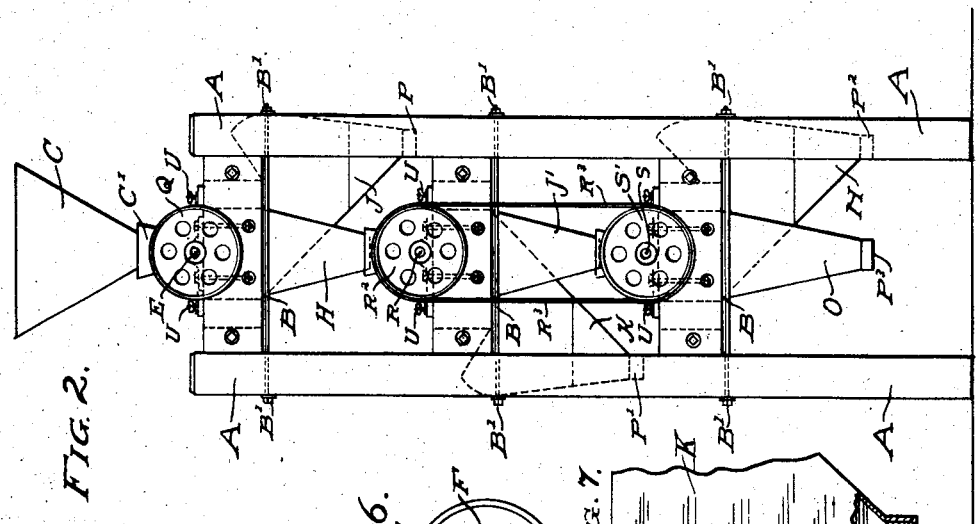
Figure 6:
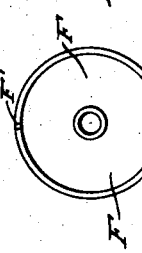
Figure 7:
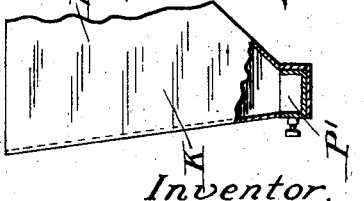

Upon the annexed drawings, Figure 1 is a front elevation of a coffee-grading machine constructed with three graders, each consisting of a circular hollow casing, a rotating wire helix within said casing and hopper above and at one end of said casing, a mesh consisting of a portion of the bottom of said casing beneath the said hopper, the other portion of said casing not having a bottom, but having a hopper whereinto the coarser-ground material falls and is collected. Fig. 2 is an end elevation of the said machine at right angles to Fig. 1. Fig. 3 is a plan corresponding to Figs. 1 and 2. Fig. 4 is a plan of the top of the framing of Figs. 1 and 2 without the top of the casing thereon and showing the rotating helical wire mounted upon its shaft within the lower part of said cylindrical casing, the wire screen below the said helical wire, and the open space between the end of the wire screen and the other end of the casing into which the coarser coffee or analogous material falls into the hopper below that space. Fig. 5 is an elevation of the lower part of the said casing, showing the helical wire in elevation, showing also a portion of the screen through the meshes of which the ground material falls, and the remaining portion of the casing having no bottom through which the ground material falls into the hopper below. Fig. 6 is an end elevation of one of the end disks by which the helical wire is carried. Fig. 7 is an enlarged detail view of a portion of one of the hoppers, showing the drawer in the bottom of the said hopper in section provided with a knob or handle for opening or closing the same.

Upon the annexed drawings the parts marked A constitute the framing of the machine. The framing is shown on the drawings as being constructed of timber and held together by bolts as being a convenient way of constructing the framing; but it is to be understood that instead of using a wooden framing I may use a framing made of cast-iron. The bolts B are those by which the several parts of the framing, both the uprights and cross-bars, are rigidly held together by the nuts B' thereon. In the upper part of the machine, as shown at Figs. 1, 2, and 3, the hopper C is carried. This hopper rests in a hopper-carrier C', forming part of the casing D, containing the upper rotating wire helix. The portion of the casing D shown broken out at the right-hand end thereof and beneath the hopper C shows not only the coffee or ground material passing into the upper casing D, but it shows that a considerable space or depth of the helix is surrounded by the ground coffee as it falls from the hopper C into the casing D. Unlike the blade of an ordinary screw-creeper which extends between the shaft upon which it is carried to the interior of the casing in which it rotates the helical carrier in the device constituting my invention consists only of the width or diameter of the wire of which it is made, which is held rigidly in place by its two ends being fastened in the disks F F by the ends of the wire being secured in the holes F', Fig. 6, one in each disk, and by the exterior of the wire helix bearing with sufficient operating closeness against the interior of the casing D and screen constituting a portion of the lower part of said casing. By means of this construction of the helix of wire, preferably round wire, that portion only of the ground material which immediately is in contact with said wire over the sieve G in the bottom of the casing is moved horizontally at a time, while that portion which is too large or coarse in the size of its particles, preventing it from passing through the sieve G, falls over the end of the sieve into the hopper J. As the coffee is moved forward and some of it is separated by falling through the sieve G those portions of the coffee or other ground material by so falling gradually sink downward and become operative by the wire helix in the second casing I. As the ground material which passes through the sieve G of the first casing D is caught in the hopper H it further descends from the hopper H into the second casing I, containing the second wire helix, wherein it is operated upon in a similar manner as that which has already been herein described with reference to the operation which takes place within the first casing D, so that the finer portions, which pass through the mesh in the lower part of the second casing I, fall into the hopper J' beneath the wire sieve of the casing I, and the coarser portions of the ground material, which do not pass into the hopper J', fall over at the end of the sieve of the second casing I into the hopper K, wherein it is contained until removed, as hereinafter described. The ground coffee or other material which has fallen into the hopper J' then passes into the third cylindrical casing M, wherein it is similarly operated upon by the rotating wire helix therein, the finest portions of the coffee or other ground material falling through the still finer sieve of the bottom of this third casing M and collected therein, while the coarser portions separated from the finer portion falls into the hopper N and is collected therein.

By the action of the machine, as hereinbefore described and shown upon the annexed drawings, three different grades of coffee or other material which has been ground are collected in the hoppers J, K, and N and the finest portion of the dust is collected in the hopper O. The lower part of each hopper J, K, and N is provided with a door or drawer P P' P², such a drawer P' being shown at the enlarged detail view, Fig. 7, at the bottom of the hopper K and provided with a knob V for enabling the drawer to be opened and closed by the attendant, which on being opened or withdrawn and a separate receptacle being placed below the discharge the opening at the bottom of each hopper J, K, and N enables the coffee to be drawn out of the machine in three different grades, while the dust or exceedingly fine material which has been finally separated from the coffee is collected by opening the door or drawer P³ in the bottom of the hopper O.

The wire helix moves along the screen, only the ground material lying immediately thereon, to the depth or diameter of the wire constituting the helix. The ground material lying above this depth is not moved over the screen until it by its vertical movement downward from the hopper by gravity reaches the screen.

The machine constituting my invention is driven from any convenient prime mover or revolving shaft by an endless driving-belt passing over the pulley Q on the shaft E. At the other end of the shaft E there is another pulley Q', over which the belt Q² passes and actuates another pulley R' upon one end of the driving-shaft R. At the other end of the shaft R there is another driving-pulley R², over which the belt R³ passes and drives the pulley S' on the third driving-shaft S, so that all three of the rotating shafts E, R, and S, together with the wire helix on each shaft, is rotated within each of the casings D, I, and M.

If required, as may sometimes be necessary, that the shafts E, R, and S and the wire helices carried thereby should be driven at different rates of rotation, then the diameters of the pulleys Q Q', R' R², and S' may be varied accordingly.

The sliding door T for regulating the quantity of coffee or other ground material passing into the first casing and rotating wire helix consists simply of a flat plate fitted in slides wherein it is moved by hand into any position required to give the necessary area.

The upper half of each of the casings D, I, and M is made of light thin metal, such as galvanized iron, and has a flange extending along each of its straight sides. A sufficient number of holes is formed in each of these straight sides for a screwed stud fixed in the framing of the machine to pass up through. Upon these studs the winged nuts U are screwed and hold the upper half of the casing over, so as to inclose the rotating wire helices by screwing off the nuts U. The upper half of the casing may be removed and the whole of the interior of the casing and helices exposed to view for cleaning, for repairs, or for any other purpose.

Having now described the nature of my said invention, what I consider to be novel and original, and therefore claim as the invention to be secured to me by Letters Patent, is as follows:

1. In a machine for grading ground or pulverized substances such as coffee, the combination of the revolving wire helix carried upon a revolving shaft and contained within a casing, at one end of the upper part of which casing is a hopper having an adjustable opening for admitting the ground material into the casing within which the revolving wire helix is contained, said casing having a screen beneath the hopper and beneath the revolving wire helix, the screen, the remainder of the bottom of the casing being imperforate and opening into a second hopper, the drawer in the bottom of the second hopper, the second hopper, the second casing whereinto the second hopper discharges, the screen in the bottom of the second casing, the second revolving helix within the second casing, the third hopper, the drawer in the bottom of the third hopper, all operating substantially as hereinbefore described.

2. In a machine for grading ground or pulverized substances such as coffee, the combination of the revolving wire helix carried upon a revolving shaft and contained within a casing, at one end of the upper part of which casing is a hopper having an adjustable opening for admitting the ground material into the casing within which the revolving wire helix is contained, said casing having a screen beneath the hopper and beneath the revolving wire helix, the screen, the remainder of the bottom of the casing being imperforate and opening into a second hopper, the drawer in the bottom of the second hopper, the second hopper, the second casing whereinto the second hopper discharges, the screen in the bottom of the second casing, the second revolving helix within the second casing, the third hopper, the drawer in the bottom of the third hopper, the third revolving helix within the third hopper, the screen in the bottom of the third hopper, the opening into a fourth hopper, the fourth hopper, the drawer in the bottom of the fourth hopper, all operating substantially as hereinbefore described.

In testimony whereof I have hereunto set my hand and seal, at the city of Los Angeles aforesaid, in the presence of two subscribing witnesses.

FRANK CONNER. [L. S.]

Witnesses:
St. John Day,
J. D. Cory.